June 8, 1965   J. J. SABATINI   3,187,870
OVERRUNNING CLUTCH WITH ECCENTRICALLY MOUNTED
THREADED DRIVEN MEANS
Filed Dec. 10, 1962
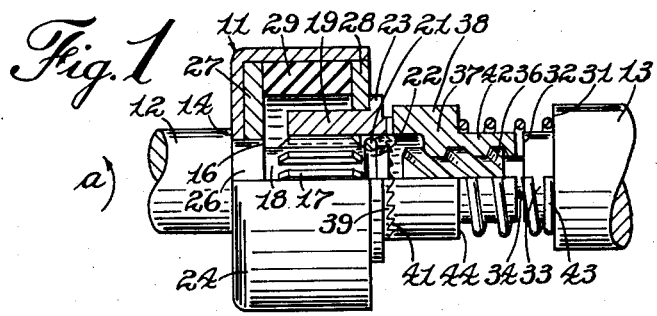
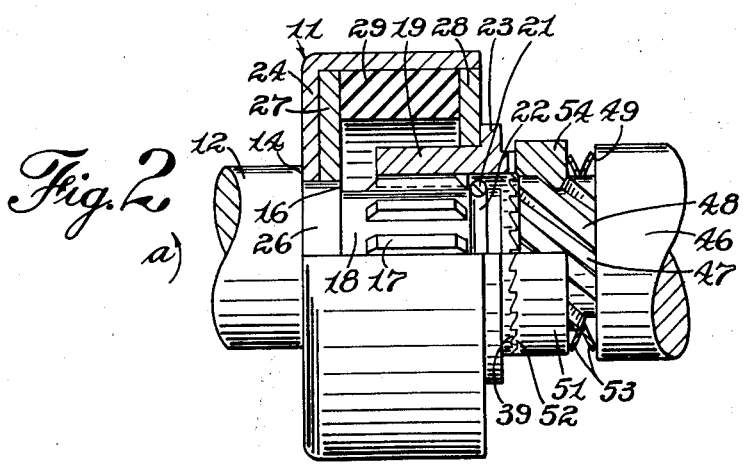
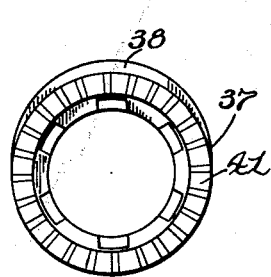
INVENTOR.
John J. Sabatini
BY
John Phillip Ryan
ATTORNEY
WITNESS:
Esther M. Stockton

United States Patent Office 3,187,870
Patented June 8, 1965

3,187,870
OVERRUNNING CLUTCH WITH ECCENTRICALLY MOUNTED THREADED DRIVEN MEANS
John J. Sabatini, Elmira, N.Y., assignor to The Bendix Corporation, Elmira Heights, N.Y., a corporation of Delaware
Filed Dec. 10, 1962, Ser. No. 243,227
7 Claims. (Cl. 192—104)

The present invention relates to a clutch and, more particularly, relates to an inertia type clutch actuated by an eccentrically formed driven clutch member.

It is an object of the present invention to provide an inertia type clutch which is simple, efficient, reliable and economical to manufacture.

It is another object of the present invention to provide an overrunning clutch adapted for use as a direct cranker starter.

It is still another object of the present invention to provide an overrunning clutch adapted for use in all types of starter gearing.

With the above and other objects in view which will appear as the description proceeds, this invention resides in the novel construction, combination and arrangement of parts substantially as hereinafter described and more particularly defined in the appended claims, it being understood that such changes in the embodiments of the hereindisclosed invention may be made as come within the scope of the claims.

The accompanying drawing illustrates two complete examples of the physical embodiments of the invention constructed according to the best modes so far devised for the practical application of the principles thereof and, in which:

FIGURE 1 is a plan view, partly in section and broken away, illustrating a clutch embodying the invention;

FIGURE 2 is a plan view similar to FIGURE 1 but illustrating a modified embodiment of the invention;

FIGURE 3 is an enlarged, detail end view of the eccentric driven clutch member illustrated in FIGURE 1; and FIGURE 4 is a detail plan view of the eccentric driven clutch member illustrated in FIGURE 2, portions thereof being broken away and in section for the sake of clarity.

Referring now more particularly to the accompanying drawing in which like numerals indicate like parts, in FIGURE 1 there is illustrated a direct cranker starter generally designated 11 which embodies the invention. A free extremity of a prime mover's shaft 12 is positioned in spaced axial alignment with a driven shaft 13 of the engine to be started. The driving shaft is reduced in diameter to provide step-like shoulders 14 and 16. Straight axial splines 17 are formed on the smallest diameter portion 18 of the shaft.

An annular sleeve 19, having complementing internal axial splines, is slidably but non-rotatably supported on the shaft portion 18 to provide a driving clutch member. A lock ring 21, seated in a groove 22 in the shaft 12, limits the rightward axial movement of the driving clutch member 19 in FIGURE 1 while the shoulder 16 establishes the limits of axial movement to the left. A radial flange 23 is formed on the driving clutch member.

The cup-shaped cover 24 base portion compressively engages the shaft shoulder 14 and is journalled on the reduced diameter portion 26 of the shaft 12. A washer 27 is also journalled on the shaft portion 26 while a second washer 28 compressively engaging the flange 23 is journalled on the exterior surface of the driving clutch member. A resiliently yieldable annulus 29, preferably formed or rubber or similar material, is sandwiched between the washers 27 and 28. The side wall of the housing 24 overlies the annular compression member 29 and the peripheral portions of the washers 27 and 28.

The driven engine shaft 13 is reduced in diameter to provide shoulders 31 and 32 and reduced diameter portions 33 and 34. The shaft portion 34 has integral helical splines 36 formed thereon. It will be readily understood that the helical splines or screw threads may be conveniently formed as a threaded sleeve which is, in turn, fixedly secured to the shaft 13. A clutch nut 37 is threaded on the screw threads to provide a driven clutch member. The threads and axial bore of the driven clutch member 37 are formed so as to be coaxial with the axis of the driven shaft 13 but external peripheral portions of the driven clutch member are formed to be out-of-round as at 38 whereby providing an eccentric characteristic to the driven clutch member.

The adjacent faces of the driving and driven clutch members 19 and 37, respectively, are provided with saw-toothed dentils 39 and 41, respectively, adapted when the clutch members are engaged to provide an overrunning torque transmitting connection. The driven clutch member 37 has an annular axial extension 42 which is adapted to abut the driven shaft shoulder 32 to limit the movement of the driven clutch member away from the driving clutch member. Preferably the total separation between the shaft shoulder 32 and the annular extension 42 during engagement of the clutch elements should be held to slightly more than dentil tooth depth to prevent a posisble lag in the driven clutch member's return or re-engagement with the driving clutch member. A coil spring 43 is compressively supported on the shaft diameter 33 and the driven clutch annulus 42 between the shoulders 31 and 44 to normally yieldably urge the driven clutch member into engagement with the driving clutch member.

In operation—starting with the elements in the positions illustrated in FIGURE 1, rotation of the driving shaft 12 (counterclockwise when viewing the left-hand end of the figures, as indicated by arrow a) will be transferred through the splines 17 to the driving clutch member 19 and thence via the engaged dentils 39 and 41 to the driven clutch member 37 and thence through the helical splines 36 to the driven shaft 13. The compression spring 43 will normally maintain the clutch member drivingly engaged so long as the speed of rotation of the driven shaft is below a predetermined speed. Shock, incident to initiating cranking and due to the inertia of the engine or device to be rotated, is momentarily absorbed by the annular compression member 29. When the driving clutch rotates, the driven shaft will momentarily tend to remain stationary thereby causing the driven clutch member 37 because of its dentiled engagement with the driving clutch member to be threaded to the left in FIGURE 1 relative to the supporting shaft 13. The driving clutch 19 will be urged axially to the left on the spline 17 relative to the driving shaft 12 thereby compressing the annular compression element 29. When the driven device begins to rotate, the compression element will assert itself and restore the compressed energy stored therein to the clutch to assist in the starting or rotating function. When the device being driven starts or causes the driven shaft 13 to rotate at or above a predetermined speed, the dentils will overrun in a normal manner and centrifugal force will be generated which will act upon the eccentric driven clutch nut causing an inertia effect to exist. The developed inertia, in turn, will cause the driven clutch nut 37 to tend to remain stationary relative to the driven shaft whereby the clutch nut will be threaded on the rotating helical splines 36 away from engagement with the driving clutch member. Axial travel of the driven clutch member will be limited to the extent of the axial separation existing between the annular portion 42 and the shoulder 32, which separation ideally is slightly more than dentil tooth depth. So long as the driven sshaft speed continues to exceed the predetermined speed, the generated centrifugal forces and the eccentric features in the clutch nut will combine to maintain the clutch members separated and disengaged. When the driven shaft ceases to rotate at or above the predetermined speed, the compression spring 43 will overcome the forces acting upon the clutch nut and will cause the nut to be threaded to the left in FIGURE 1 toward and into engagement with the driving clutch member.

A second embodiment of the invention is illustrated in FIGURE 2. The driving shaft, the driving clutch member and the parts associated with the clutch driving elements are identical to those described for the embodiment of FIGURE 1. The driven shaft 46 again could be the shaft of an engine to be started or it may be a portion of a pinion gear (not shown) of a standard type starter drive gearing which is well known in the art. The shaft is reduced in diameter as at 47 and has formed or mounted thereon screw threads 48. The reduction in shaft diameter provides a radial shoulder 49. The driven clutch member consists of a control nut 51 threaded on the screw threads and adapted to move toward and away from engagement with the driving clutch member 19. Dentils 52 are formed on a radial face of the clutch nut and are adapted to engage the dentils 39 on the adjacent face of the driving clutch member. Opposed spring washers 53 encompass the driven shaft 46 and normally bias the control nut toward and into engagement with the driving clutch member. The control nut is formed with internal thread means which are coaxial with the driven shaft axis but peripheral portions of the control nut are formed so as to be out-of-round as at 54 to thereby provide an eccentric characteristic to the control nut. Operation of this second embodiment of the invention is substantially identical to that above described for the operation of the embodiment of FIGURE 1.

From the foregoing description, taken together with the accompanying drawing, it will be readily apparent that this invention provides a clutch meeting all the hereinbefore stated objects.

I claim:
1. A clutch comprising, in combination:
   a driving shaft of a prime mover, said shaft having a free extremity;
   a driven shaft in axial alignment with the free extremity of the driving shaft, said driven shaft having helical splines thereon;
   a driving clutch member non-rotatably supported on the free extremity of the driving shaft;
   a driven clutch member threaded on said driven shaft adapted for movement toward and away from engagement with the driving clutch member, said driven clutch member being eccentrically formed relative to its own axis whereby said driven clutch member is caused to be threaded away from engagement with the driving clutch member responsive to rotation of the driven shaft at and above a predetermined speed;
   means formed on each of said clutch members for effecting an overrunning torque transmitting connection; and,
   means for yieldably biasing the driven clutch toward and into engagement with said driving clutch member when said driven shaft rotates below the predetermind speed.

2. A clutch of the type set forth in claim 1 further comprising means on the driven shaft for limiting the movement of said driven clutch member away from the driving clutch member.

3. A clutch comprising, in combination:
   a driving shaft of a prime mover, said shaft having a free extremity;
   a driven shaft in axial alignment with the free extremity of the driving shaft, said driven shaft having screw threads thereon;
   a driving clutch member supported on the free extremity of the driving shaft;
   means on the driving clutch member and the driving shaft for allowing axial movement of the driving clutch member relative to the driving shaft;
   an eccentrically driven clutch member threaded on the driven shaft adapted for movement toward and away from engagement with the driving clutch member, said driven shaft screw threads and said driven clutch member's eccentricity being adapted to cause said driven clutch member to be threaded away from engagement with the driving clutch member responsive to rotation of the driven shaft at and above a predetermined speed;
   complementing dentil teeth on said clutch members for effecting an overrunning torque transmitting connection when said clutch members are engaged; and,
   means for yieldably biasing the driven clutch member toward and into engagement with said driving clutch member when said driven shaft rotates below the predetermined speed.

4. A clutch for the type set forth in claim 3 further comprising means on the driven shaft for limiting the movement of said driven clutch member away from the driving clutch member.

5. A clutch of the type set forth in claim 3 further comprising:
   shoulder means formed on the driving shaft intermediate the shaft free extremity and the prime mover;
   flange means formed on the driving clutch member;
   means including a resiliently yieldable member supported intermediate said shoulder and said flange for urging the driving clutch member towards the driven shaft, said last named means adapted to be compressed to allow axial movement of the driving clutch and to momentarily absorb torque overloads incident to torque transmission.

6. A direct cranking starter for internal combustion engines comprising, in combination:
   a driving shaft of a prime mover, said shaft having a free extremity;
   a driven shaft of the engine in spaced axial alignment with said driving shaft, said driven engine shaft having means providing screw threads supported thereon;
   a driving clutch member supported on the free extremity of the driving shaft;
   complementing axially formed spline means on the driving shaft and the driving clutch member for allowing axial movement of the driving clutch member relative to the driving shaft;
   a driven clutch member threaded on the driven engine shaft adapted for movement into and out of engagement with the driving clutch member;
   means on the driven clutch member eccentrically located relative to the driven clutch member's axis adapted to cause the driven clutch member to be threaded on the driven engine shaft away from engagement with the driving clutch member responsive to rotation of the driven engine shaft at and above a predetermined speed;
   complementing dentil teeth formed on adjacent faces of said clutch members for effecting an overrunning torque transmitting connection when said clutch members are engaged; and,
   spring means for yieldably biasing the driven clutch member toward and into engagement with the driving clutch member when said driven engine shaft rotates below the predetermined speed.

7. Direct cranking starter of the type set forth in claim 6 further comprising:
   means on the driven engine shaft for limiting the movement of said driven clutch member away from the driving clutch member; and,
   means including a resiliently yieldable member supported on the driving shaft and the driving clutch member for urging the driving clutch member toward said driven member shaft and further adapted to be compressed to allow axial movement of the driving clutch member away from said driven clutch member whereby momentary torque overloads on the clutch members are absorbed.

References Cited by the Examiner

UNITED STATES PATENTS

| | | | |
|---|---|---|---|
| 2,154,591 | 4/39 | Waseige | 192—104 X |
| 2,469,792 | 5/49 | Buxton et al. | 74—7 |
| 2,546,940 | 3/51 | Buxton | 74—7 |
| 2,921,473 | 1/60 | Fellows | 74—7 |

FOREIGN PATENTS

| | | |
|---|---|---|
| 219,975 | 7/24 | Great Britain. |
| 259,013 | 6/28 | Italy. |

DAVID J. WILLIAMOWSKY, *Primary Examiner.*